United States Patent [19]

Dubovetsky et al.

[11] 4,336,436
[45] Jun. 22, 1982

[54] METHOD FOR WELDING GIRTH JOINTS IN PIPE LINES

[76] Inventors: Vasily Y. Dubovetsky, Bulvar Lesi Ukrainki, 2, kv. 35; Leonid N. Kopylov, ulitsa Saljutnaya, 27, kv. 44; Valentin A. Kotov, ulitsa Lenina, 88, kv. 64; Jury I. Saprykin, ulitsa Semashko, 21, kv. 34; Vladimir I. Slepchenko, ulitsa Uritskogo, 11, kv. 92; Boris E. Paton, ulitsa Chkalova, 41a, kv. 26; Igor K. Pokhodnya, ulitsa Chkalova, 41a, kv. 25; Vladimir E. Paton, ulitsa Anri Barbjusa, 22/26, kv. 64; Mikhail G. Belfor, pereulok Ivana Maryanenko, 11, kv. 28; Efim Y. Leschinsky, ulitsa Fedorova, 16, kv. 13; Andrei N. Kutovoi, ulitsa Gogolevskaya, 32, kv. 5; Mikhail R. Unigovsky, ulitsa Pushkinskaya, 21, kv. 33; Veniamin S. Rotenfeld, ulitsa Sh.Aleikhema, 1, kv. 17; Valery N. Shlepakov, ulitsa Pushkinskaya, 45, kv. 9; Jury A. Gavriljuk, ulitsa Parkhomenko, 9, kv. 36, all of Kiev; Alexandr G. Mazel, Aptekarsky pereulok, 8/2, kv. 9; Mark Z. Sheinkin, ulitsa Kedrova, 3, kv. 91, both of Moscow; Orest M. Serafin, ulitsa Derezhabelnaya, 28, korpus 1, kv. 45, Dolgoprudny, Moskovskaya oblast, all of U.S.S.R.

[21] Appl. No.: 7,193
[22] Filed: Jan. 29, 1979
[51] Int. Cl.³ .................. B23K 31/06; B23K 9/12
[52] U.S. Cl. .................. 219/61; 219/60 A; 219/125.11; 219/125.12; 228/29
[58] Field of Search .......... 219/60 A, 60 R, 61, 219/125.12, 124.33, 125.11; 228/27, 28, 29

[56] References Cited

U.S. PATENT DOCUMENTS

| | | | |
|---|---|---|---|
| 2,795,689 | 6/1957 | McNutt | 219/60 A X |
| 2,892,070 | 6/1959 | Kitrell | 219/60 A X |
| 2,892,071 | 6/1959 | Kitrell | 219/60 A X |
| 3,185,814 | 5/1965 | Rossner et al. | 219/125.12 X |
| 3,188,445 | 6/1965 | Rieppel et al. | 219/60 A |
| 3,207,881 | 9/1965 | Pagan | 219/60 A |
| 3,268,707 | 8/1966 | Thomas | 228/27 X |
| 3,277,567 | 10/1966 | Rieppel et al. | 228/29 X |
| 3,461,264 | 8/1969 | Nelson et al. | 219/60 A |
| 3,551,636 | 12/1970 | Nelson | 219/124.33 |
| 3,632,959 | 1/1972 | Nelson et al. | 219/124.33 X |
| 3,777,103 | 12/1973 | White et al. | 219/60 A |
| 4,132,338 | 1/1979 | Bove et al. | 219/60 A X |
| 4,176,269 | 11/1979 | Merrick et al. | 219/60 A |
| 4,179,059 | 12/1979 | Chang et al. | 219/60 A |

FOREIGN PATENT DOCUMENTS

| | | |
|---|---|---|
| 283861 | 8/1970 | Austria . |
| 52-69848 | 6/1977 | Japan ............ 219/61 |

Primary Examiner—J. V. Truhe
Assistant Examiner—Keith E. George
Attorney, Agent, or Firm—Fleit & Jacobson

[57] ABSTRACT

A method and apparatus for welding girth joints in pipelines using two welding heads comprises the steps of moving each of the welding heads upwards around the pipeline along the respective section of the girth joint, feeding a welding wire to each of the welding heads so that the welding wire is fed substantially tangentially with respect to the surface of the pipe, and forming a circumferential weld by moulding it to hold the molten metal of the welding bath in the welding zone. An apparatus for carrying out the method for welding girth joints in pipelines comprises an annular track structure having at least two carriages mounted thereon which are connected with drives adapted to impart a translatory motion to the carriages. Each of the carriages carries a welding head provided with a welding wire feeder and a weld moulding member arranged opposite to the joint being welded. The welding wire feeder includes a guiding nozzle extending under the weld moulding member, with its axis being oriented tangentially to the surface of the pipe to feed the welding wire into the welding zone through the groove of the joint.

7 Claims, 20 Drawing Figures

METHOD FOR WELDING GIRTH JOINTS IN PIPE LINES

FIELD OF THE INVENTION

The invention relates to welding processes and equipment, and more particularly to methods and apparatus for welding girth joints in pipe lines.

BACKGROUND OF THE INVENTION

The problem of mechanization and automation of welding processes when laying main pipe lines is relatively old, however, up to now girth joints in pipe lines are welded by hand. This is due to the imperfection of conventional techniques and equipment as well as to the peculiar features of assembly of pipelines, consisting in welding each subsequent pipe or a plurality of previously welded pipes to the butt of a stationary main pipeline already assembled and indicates that this problem has not been solved as efficiently as is desirable.

When welding two or more short pipes, use is commonly made of stationary apparatus having immovable welding heads and a mechanism adapted to rotate the pipes being welded. The welding techniques and equipment are sufficiently adequate and substantially comply with the requirements placed thereupon. When such apparatus are used, the pipes being welded are synchronously rotated at a predetermined speed and thereby the joint sections to be welded are brought to the welding heads. However, such techniques and equipment are inapplicable in butt welding of the ends of main pipelines, particularly because the length of the main pipe line already assembled cannot be rotated.

When laying main pipelines, the joints are welded by moving one or more welding heads around the immovable pipe. Various apparatus are used for practicing this technique (cf. U.S. Pat. No. 3,777,103 and Japanese Pat. No. 49-2667). The above apparatus comprise a yoke embracing the pipeline and carrying welding heads rigidly secured thereto and provided with wire feeders. The yoke is connected with a means for rotation thereof around the pipeline being welded.

Such an arrangement provides for simultaneous welding of a girth joint with the aid of several welding heads while rotating the yoke around the pipeline. However, it may be advantageously used only in butt welding of pipes having a diameter of not more than 1000 mm and is impracticable when pipes of a larger diameter are to be welded, since the mass of movable parts, such as yokes, wire feeders, etc. sharply increases, hence the power capacity of the drive is to be increased as well.

More preferable in this respect are a method and an apparatus for welding girth joints by independently moving welding heads along a stationary track structure, as disclosed in U.S. Pat. No. 3,461,264.

The welding heads of the above apparatus are mounted on carriages having drives adapted to impart a translatory motion thereto. Each of the welding heads is provided with a welding wire feeder adapted to feed a welding wire normally to the surface of the pipe. However, the track structure does not embrace the pipe being welded along the whole circumference thereof, and thus it is impossible to weld the girth joint without displacing said track structure.

The most efficient arrangement at present are a method and apparatus for welding girth joints by independently moving welding heads along a closed annular track structure as disclosed in U.S. Pat. No. 3,277,567 and Austrian Pat. No. 283,861.

This method provides for movement of each of said welding heads around the pipeline along a respective section of the girth joint, feeding a welding wire to each welding head, and forming a circumferential weld along the whole of the joint. This method is characterized in that the welding heads are moved from the top point of the pipe downwards and fed with the welding wire at a right angle to the surface of the pipe. Welding is carried out under the conditions permitting the weld to be loosely formed.

An apparatus for carrying out the above method comprises an annular track structure composed of two semi-annular portions the ends of which are coupled by connectors, such as cylindrical hinges, enabling said semi-annular portions to be spaced apart. The annular track structure mounts carriages connected with drives adapted to impart a translatory motion thereto. Each of the carriages has a welding head mounted thereon and is provided with a welding wire feeder adapted to feed the wire through a nozzle oriented at a right angle to the surface of the pipeline. The drives of the carriages provide for a downward translatory motion of the welding heads.

An unquestionable advantage of both the method and apparatus of the prior art is that it is possible to completely weld the girth joints without displacing the track structure. However, concurrently with said advantage they suffer from a number of serious disadvantages. In particular, when welding lower and lateral sections of the girth joint under conditions permitting the weld to be loosely formed the molten metal flows out from the welding bath, which causes inadequate filling of the joint groove, fails to provide the required quality of the weld, and makes it necessary to weld the joint in several passes. It is clear that the latter factor adversely affects the efficiency of the method as well as of the apparatus. The downward travel of the welding heads is also responsible for the outflow of the molten metal.

In addition, due to repeated passes and, consequently, a respective number of layers of metal in the girth joint the physical properties thereof will deteriorate due to interlayer welding defects which are practically inevitable in any multi-pass welding process.

SUMMARY OF THE INVENTION

The principal object of the present invention is to provide a method and apparatus for welding girth joints, which preclude the outflow of molten metal of the welding bath from the joint groove when forming lower and lateral sections of the circumferential weld without substantially complicating the process and construction, respectively.

One more important object of the invention is to provide a method and apparatus for welding girth joints in pipelines, which make it possible to improve the quality of the weld and to decrease the number of passes required for the welding process.

Another object of the invention is to provide a method and apparatus ensuring a high-quality weld moulded throughout the whole depth of the joint in a minimum number of passes.

An additional object of the invention is to provide a method and apparatus for welding a girth joint having grooves of various configurations and sizes.

One more object of the invention is to provide a method and apparatus ensuring higher efficiency than that obtained by conventional technique when welding girth joints in pipe lines.

These and other objects of the invention are achieved in a method for welding girth joints in pipe lines using several welding heads, comprising the steps of moving each of said welding heads around the pipe line and the respective section of the girth joint, feeding a welding wire to each of the welding heads, and forming a circumferential weld along the whole of the girth joint, wherein according to the invention two welding heads are moved circumferentially upwards while feeding each of them with the welding wire substantially tangentially with respect to the surface of the pipe, the weld being moulded in the process of forming thereof with the molten metal bath held in the welding zone.

The outflow of the molten metal from the welding bath is prevented by moulding the weld when the lower section and the lateral sections of the girth joint are welded. This is attained by moving the welding heads upwards and thus holding the molten metal of the welding bath within the joint due to the molten metal continuously flowing onto the butt section of the weld already formed. To mould the weld, it is required that the welding wire be fed into the welding zone substantially tangentially to the surface of the pipe. The above factors assist in filling up the girth joint being welded, thereby decreasing the number of passes to be made and enhancing the efficiency and the quality of the welding.

At the initial moment of the welding process, it is preferable that one of the above welding heads should be positioned at the lowermost point of the girth joint and the other one, higher and circumferentially spaced at a distance therefrom, whereupon both welding heads should be moved upwards and, after forming a weld along the section by the second head, the latter should be moved to the lowermost point of the girth joint to weld the remaining section thereof disposed between the points of the initial position of the welding heads.

This modification offers the highest efficiency of the method of the invention and makes it possible to form a high-quality circumferential weld by two welding heads while moving circumferentially upwards on both sides of the pipe.

When welding thick-walled pipes or high-pressure containers it is expedient to feed the welding wire through the whole depth of the joint from the level of the outer surface to the level of the inner surface of the pipe in the uppermost point of the girth joint as the welding heads move upwards.

This promotes reliable fusion of the metal of the pipes being welded and the welding wire in the welding bath, both in the lower and the upper sections of the girth joint.

The simplest way to carry out the method of the invention is to feed the welding wire from the level of the outer surface of the pipe to the level of the inner surface of the pipe in a single pass when welding the upper section of the girth joint confined by the central angle ranging from 45° to 50°.

The method may be modified so as to comprise feeding the welding wire through the depth of the girth joint by positioning said wire at 15° to 20° with respect to the tangent to the surface of the pipe.

The method may further be modified by feeding the welding wire through the depth of the girth joint in parallel to the tangent to the surface of the pipe.

The most preferable is such a modification of the method, wherein the welding wire is fed by positioning it at 15° to 20° with respect to the tangent while welding the upper section of the girth joint confined by the central angle ranging from 45° to 50° and by feeding the same wire in parallel to the tangent to the surface of the pipe while welding the other sections of the girth joint.

This modification ensures the highest quality of the weld.

When welding girth joints having a wide groove, it is preferable that the welding wire be oscillated across the girth joint being welded as the welding heads are moved upwards.

The above and other objects of the invention are also achieved in an apparatus for carrying out the method set forth above, comprising an annular track structure composed of two semi-annular portions whose ends are interconnected by connectors enabling said semi-annular portions to be spaced apart, carriages mounted on said annular track structure and connected with drives adapted to impart a translatory motion thereto, welding heads mounted on said carriages and having welding wire feeders for feeding the welding wire through guiding nozzles, wherein according to the invention, each carriage is provided with a weld moulding member while the guiding nozzle of the welding wire feeder extends through the joint groove, under the weld moulding member, with its axis being oriented tangentially to the surface of the pipe when the welding heads are moved upwards.

The provision of the weld moulding member as well as the orientation mentioned above and the spatial arrangement of the guiding nozzle facilitate carrying out the method of the present invention.

An embodiment of the apparatus is possible, wherein each welding head, the guiding nozzle, and the weld moulding member are positioned on a spring-loaded lever hinged to the carriage, one end of the spring-loaded lever contacting the surface of the pipe being welded.

This makes it possible to take into account the eccentricity of the pipes being welded and to hold the welding head, guiding nozzle and weld moulding member in position.

It is advisable that the weld moulding member be provided with a pintle and be secured to the lever with the aid of a fork, the pintle extending through the holes thereof.

This arrangement provides for self-adjustment of the weld moulding member in case a slight misalignment between the edges of the pipes being welded occurs and makes the weld moulding member touch the pipes being welded only with its leading edge, which prevents the weld moulding member from being forced away from the surface of the pipe by the molten metal of the welding bath.

It is preferable that the weld moulding member be hollow and provided with a pipe for feeding a coolant into its inner space and a pipe for discharging the coolant therefrom.

This speeds up solidification of the metal in the welding bath and, at the same time, protects the weld moulding member from being acted upon by high temperatures.

The easiest way to ensure cooling and self-adjustment of the weld moulding member consists in providing the pintle having a through axial hole divided by a longitudinally extending partition into two chambers, one of which communicates with the pipe for feeding a coolant and the other one with the pipe for discharging the same coolant.

In welding girth joints by repeated passes, it is good practice to use a weld moulding member having a protrusion to be inserted into the joint as the first pass proceeds.

To carry out the method, when welding thick-walled workpieces, it is preferable that each guiding nozzle be mounted on the carriage so that its end might change its position through the depth of the girth joint and be connected with a drive adapted to change that position.

An embodiment of the apparatus is possible, wherein each guiding nozzle is mounted for angular movement through an angle of 15° to 20° to the tangent to the surface of the pipe and is connected with a drive adapted to impart such angular movement to each guiding nozzle.

Also possible is an embodiment of the apparatus, wherein each guiding nozzle is movable in parallel to the tangent to the pipe through the depth of the girth joint and is connected with a drive adapted to impart a parallel motion to each guiding nozzle.

The most advisable is an embodiment of the apparatus, wherein each guiding nozzle is movable with respect to the tangent through an angle of 15° to 20° and in parallel through the depth of the joint with respect to said tangent, and is connected with the drive adapted to impart angular movement to each guiding nozzle and with the drive adapted to impart a parallel motion to each guiding nozzle.

This embodiment ensures the highest quality of the circumferential weld.

It is expedient that the drive adapted to impart angular movement to the guiding nozzle and the drive adapted to impart a parallel motion to the same nozzle be connected to a program control unit.

The simplest form of such an embodiment of the apparatus, consists of a program control unit having a potentiometric pick-up switched into the supply circuits of the drive adapted to impart angular movement to each guiding nozzle and to have the drive adapted to impart a parallel motion to each guiding nozzle, said potentiometric pick-up interacting with a protrusion provided on the annular track structure and having a curved surface with a predetermined profile.

When welding girth joints having a wide groove, it is advisable that each guiding nozzle be mounted on the carriage for translatory movement across the girth joint being welded and be connected with a drive adapted to impart such translatory oscillating movement to each of said guiding nozzles.

It is preferable that the drive adapted to impart an oscillatory movement to the guiding nozzle is an electromagnet whose movable core is operatively connected with said nozzle.

Such an arrangement of the drive adapted to impart an oscillatory movement to the guiding nozzle enables the frequency and the amplitude of oscillations to be controlled as the welding process proceeds.

To provide for control of the amplitude, it is expedient that the electromagnet have adjustable stops of end positions of the movable core.

To improve fusing the edges of the pipes being welded and to form a high-quality weld, it is advisable that the electromagnet be switched into the supply circuit through a time relay for the purpose of retaining the welding wire in the end positions.

BRIEF DESCRIPTION OF THE DRAWINGS

The invention will now be explained in greater detail with reference to embodiments thereof which are represented in the accompanying drawings, wherein.

DETAILED DESCRIPTION OF THE INVENTION

Figure 1:
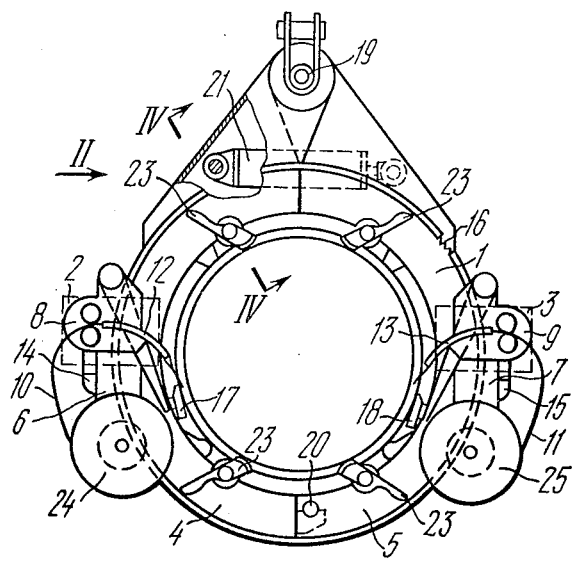
FIG. 1 shows diagrammatically an apparatus for welding girth joints in pipe lines in operative position, according to the invention.
Figure 2:
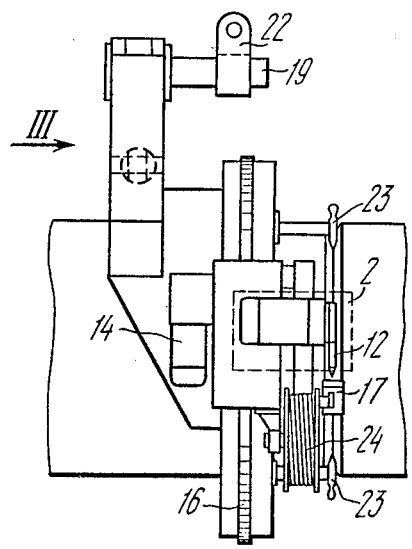
FIG. 2 shows the apparatus of FIG. 1, as viewed in the direction of arrow II, according to the invention.

According to the invention a method for welding girth joints is carried out with the aid of an apparatus shown in FIG. 1 and comprises an annular track structure 1 as well as welding heads 2 and 3. The annular structure 1 is composed of two semi-annular portions 4 and 5 and mounts carriages 6 and 7 carrying welding heads 2 and 3 as well as welding wire feeders 8 and 9 for feeding a welding wire 10 and 11 through guiding nozzles 12 and 13. The carriages 6 and 7 are connected with drives 14 and 15 adapted to impart a translatory motion to said carriages. The drives 14 and 15 mesh with a gear rim 16 of the annular structure 1. Each carriage 6 and 7 is provided with a weld moulding member 17 and 18, respectively, arranged, according to the invention, in opposed spaced relationship with the girth joint being welded. The ends of the semi-annular portions 4 and 5 are interconnected by connectors enabling said semi-annular portions to be spaced apart. Specifically, in the preferred embodiment of the invention, the upper ends of the semi-annular portions 4 and 5 are interconnected by a cylindrical hinge 19 and the lower ones, by a releasable connection 20. At the top, between the semi-annular portions 4 and 5 there is a hinge-connected power cylinder 21. The hinge 19 serves for suspending the apparatus from the boom of a vehicle, such as a pipelayer. The cylindrical hinge 19, such as shown in FIG. 2, extends beyond the semi-annular portions 4 and 5 and is inserted into a drag link 22. The semi-annular portions 4 and 5 are provided with hinge-connected rotatable locators 23 to be inserted into the groove of the girth joint as shown in FIGS. 1 and 2. The guiding nozzles 12, 13 extend through the groove of the girth joint under the weld moulding members substantially tangentially to the surface of the pipe. Reels 24 and 25 with the welding wire wound thereon are mounted on the carriages 6 and 7, respectively.

Figure 3:
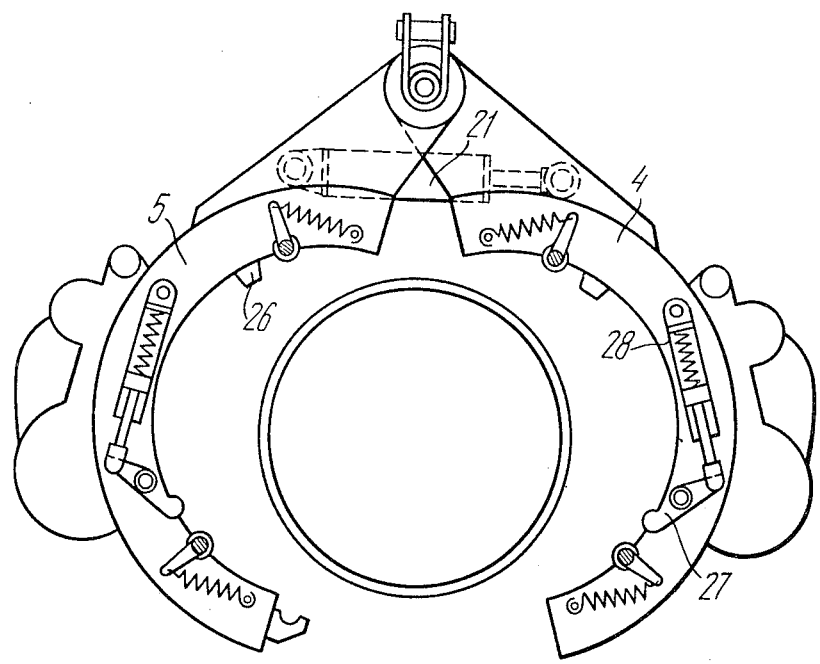
FIG. 3 shows the apparatus of FIG. 2 with semiannular portions thereof spaced apart, as viewed in the direction of arrow III.

Reference is now made to FIG. 3 which distinctly shows bearing members 26 of the semi-annular portions 4 and 5 as well as rotatable clamping members 27 connected to power cylinders 28.

Figure 4:
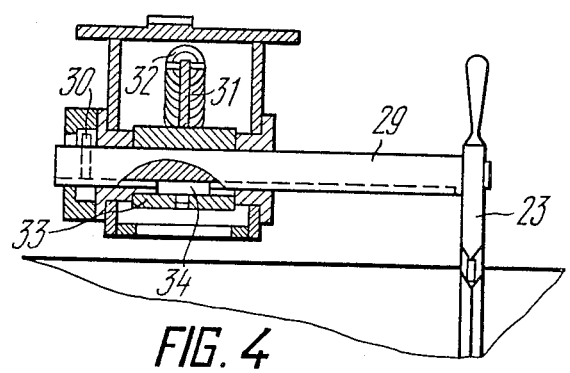
FIG. 4 is a view of the unit for fixing the annular track structure, taken along line IV—IV in FIG. 1, according to the invention.

Referring to FIG. 4, the rotatable locators 23 are secured to the semi-annular portions 4 and 5 by retractable bars 29. A lug 30 is provided at the end of the retractable bar 29 for fixing the latter in its end extended position. The retractable bar 29 is connected with a radial lever 31 loaded by a spring 32. The lever 31 is secured to a bushing 33 which is connected with the retractable bar 29 by a key 34. The retractable bar 29 is provided with a keyway through the whole of its length. Thus the retractable bar 29 is axially movable with respect to the bushing 33 which serves as a guide and rotatable therewith under the action of the spring 32, which provides for confining the rotatable locator 23 in the groove of the joint.

Figure 5:
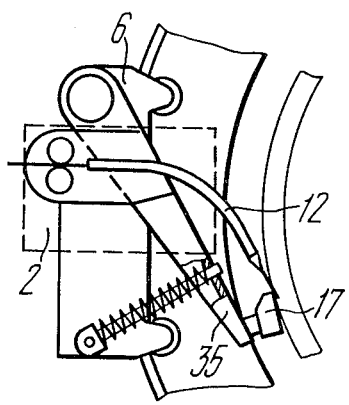
FIG. 5 shows the unit for mounting the welding head, guiding nozzle, and the weld moulding member on the carriage, according to the invention.

Referring to FIG. 5, the welding head 2 is mounted on a lever 35 whose one end is brought into contact with the surface of the pipe being welded through the weld moulding member 17. the other end of the lever 35 is hinged to the carriage 6. The lever 35 is resiliently held against the pipe being welded. The guiding nozzle 12 and the weld moulding element 17 are mounted, according to the invention, on said lever 35. The welding head 3, guiding nozzle 13 and the weld moulding element 18 are mounted on the carriage 7 in a similar manner.

Figures 6, 7:
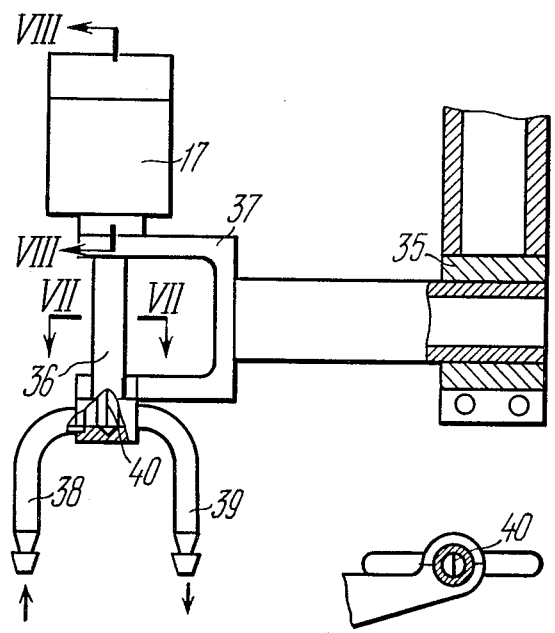
FIG. 6 shows the unit for securing the weld moulding member to the lever, according to the invention.
FIG. 7 is a view of the pintle and a portion of the fork, taken along line VII—VII in FIG. 6, according to the invention.
Figure 8:
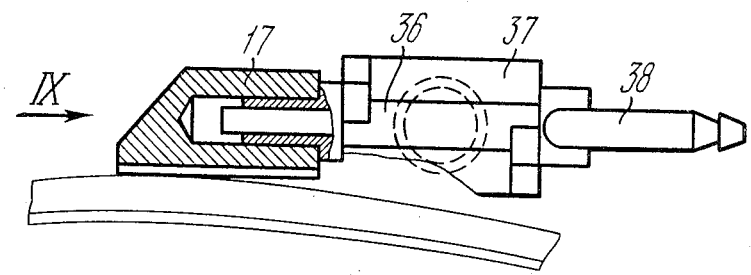
FIG. 8 is a partially cut-away view of the weld moulding member, taken along line VIII—VIII in FIG. 6, according to the invention.
Figure 9:
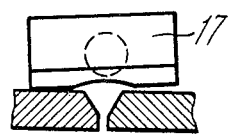
FIG. 9 shows an arrangement of the weld moulding member when the edges of the pipes being welded are misaligned, as viewed in the direction of arrow IX in FIG. 8, according to the invention.

Referring now to FIG. 6, the weld moulding member 17 has a pintle 36 and is secured to the lever 35 with the aid of a fork 37, the pintle extending through the holes thereof. The weld moulding member is hollow and provided with a pipe 38 for feeding a coolant into its inner space and a pipe 39 for discharging the coolant therefrom. The pipes 38 and 39 communicate with the pintle 36. The pintle 36 is provided with a through axial hole divided by a longitudinally extending partition 40 into two chambers as is clearly shown in FIG. 7. One of said chambers communicates with the pipe 38 for feeding a coolant and the other one with the pipe 39 for discharging the same coolant. Thus, as is clearly illustrated in FIG. 8, the pipes 38 and 39, the pintle 36 and the weld moulding member 17 form a circulating cooling system, and the hinged mounting of the pintle 36 in the fork 37 enables the weld moulding member to contact the surface of the pipe with its leading edge only, even if some misalignment between the edges of the pipes being welded occurs, as shown in FIG. 9.

Figure 10:
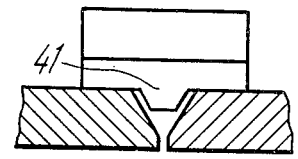
FIG. 10 shows an embodiment of the weld moulding member having a protrusion to be inserted into the joint, according to the invention.

It is to be understood that the weld moulding member 17 may take various configurations. In particular, it may be provided with a protrusion 41 to be inserted into the groove of the joint as shown in FIG. 10. Such configuration is preferable when girth joints are welded in several passes.

It will be clear that the weld moulding elements 17 and 18 are identically shaped in any modification of the apparatus.

Figure 11:
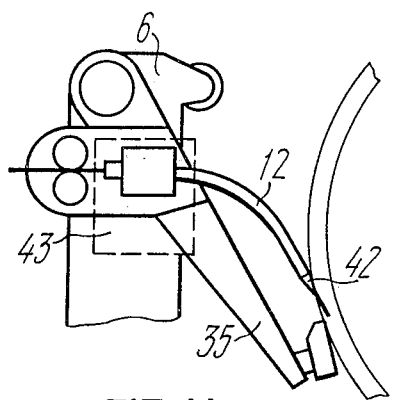
FIG. 11 shows an embodiment of the apparatus comprising a movable guiding nozzle, according to the invention.

Reference is now made to FIG. 11 showing an embodiment of the apparatus which comprises a movable guiding nozzle 12. The other part of the apparatus and the pipe line is not shown. This embodiment of the apparatus is preferable when welding thick-walled pipes and enables the guiding nozzle 12 to be mounted on the carriage 6 so that its end 42 may change its position through the depth of the joint. For this purpose, the guiding nozzle 12 is connected to a drive 43 adapted to change its position.

Figure 12:
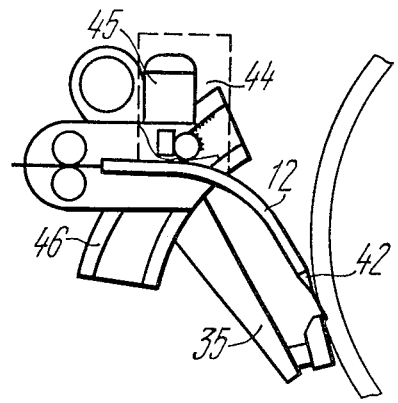
FIG. 12 shows an embodiment comprising a drive adapted to impart movement to the guiding nozzle through an angle to the tangent to the surface of the pipe, according to the invention.
Figure 13:
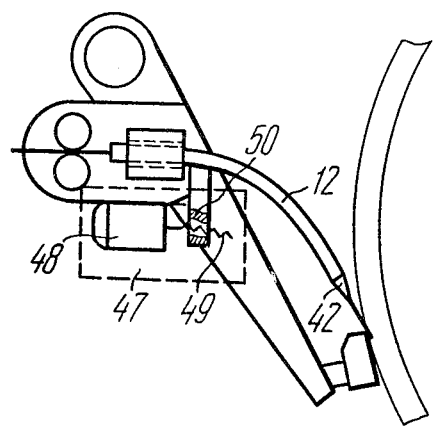
FIG. 13 shows an embodiment comprising a drive adapted to impart a parallel motion to the guiding nozzle with respect to the tangent to the surface of the pipe, according to the invention.

Three versions of this embodiment are possible. Particularly, as is shown in FIG. 12, the guiding nozzle 12 is mounted for movement through an angle of 15° to 20° to the tangent to the surface of the pipe, for which purpose said nozzle is hinged to lever 35. The drive 43 adapted to change the position of the guiding nozzle 12 is made in this case as a drive 44 adapted to impart an angular movement to the same guiding nozzle and comprises an electric motor 45 operatively connected with a toothed sector 46 which serves as a guide for the nozzle 12. The second version of the embodiment shown in FIG. 11 provides, as can be seen in FIG. 13, for mounting the guiding nozzle 12 on the lever 35 of carriage 6 for parallel motion with respect to the tangent to the pipe through the depth of the joint. In this case the drive 43 adapted to change the position of the end 42 of the guiding nozzle 12 is a drive 47 adapted to impart a parallel motion to the guiding nozzle with respect to the tangent to the surface of the pipe. The drive 47 comprises an electric motor 48 connected with the guiding nozzle 12 by a motion screw 49 and a nut 50.

Figure 14:
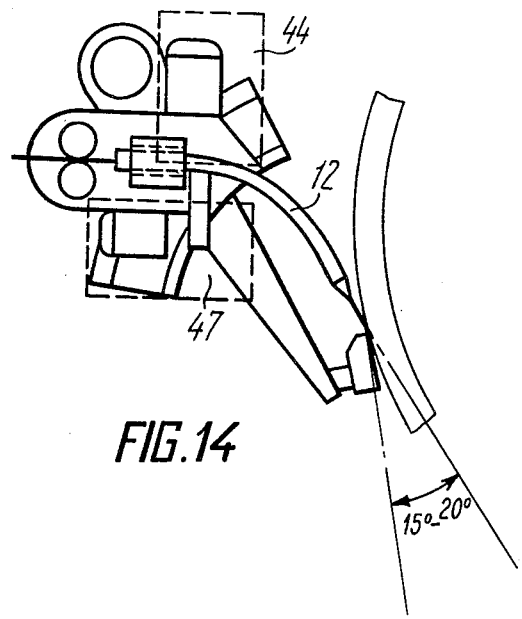
FIG. 14 is a combined view of the embodiments, illustrated in FIGS. 12 and 13, according to the invention.

The third version of this embodiment (FIG. 14) is preferable and is essentially a combination of those shown in FIGS. 12 and 13, described above. The guiding nozzle 12 is connected to both the drive 47 adapted to impart said parallel motion and the drive 44 adapted to impart said angular movement to the guiding nozzle 12.

Figure 15:
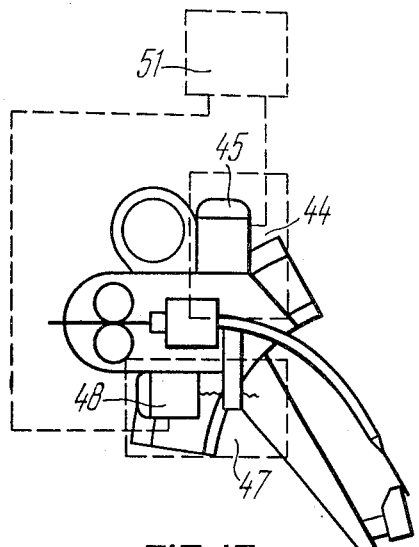
FIG. 15 shows a control circuit of the drives adapted to displace the guiding nozzle, according to the invention.

Referring to FIG. 15, the drive 44 and the drive 47 are connected to a control program unit 51. The control program unit may be variously constructed. In particular, the data necessary for supplying control signals may be recorded on a tape and transmitted to the drives from the tape-reading heads. Besides, the control program unit 51 may be composed of cam plates fitted on a common shaft. When the carriages are moved the cam plates interact with contactors or rheostats in the supply circuits of electric motors 45 and 48 of the drives 44 and 47 respectively.

Figure 16:
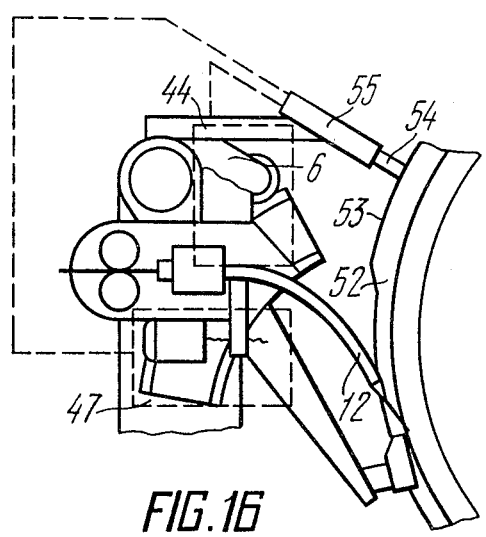
FIG. 16 shows an embodiment of the program control unit of the drives adapted to displace the guiding nozzle, according to the invention.

The most reliable is the embodiment of the program control unit 51, shown in FIG. 16. According to this embodiment the annular track structure throughout the whole perimeter thereof is provided with a protrusion 52 having a curved surface 53 of a predetermined profile. A pressing member 54 of a potentiometric pick-up 55 mounted on the carriage 6 is brought into contact with the curved surface 53 of the protrusion 52. The potentiometric pickup 55 is switched into the supply circuits of the drive 44 adapted to impart an angular movement and the drive 47 adapted to impart a parallel motion to the guiding nozzle 12.

Figures 17, 18:
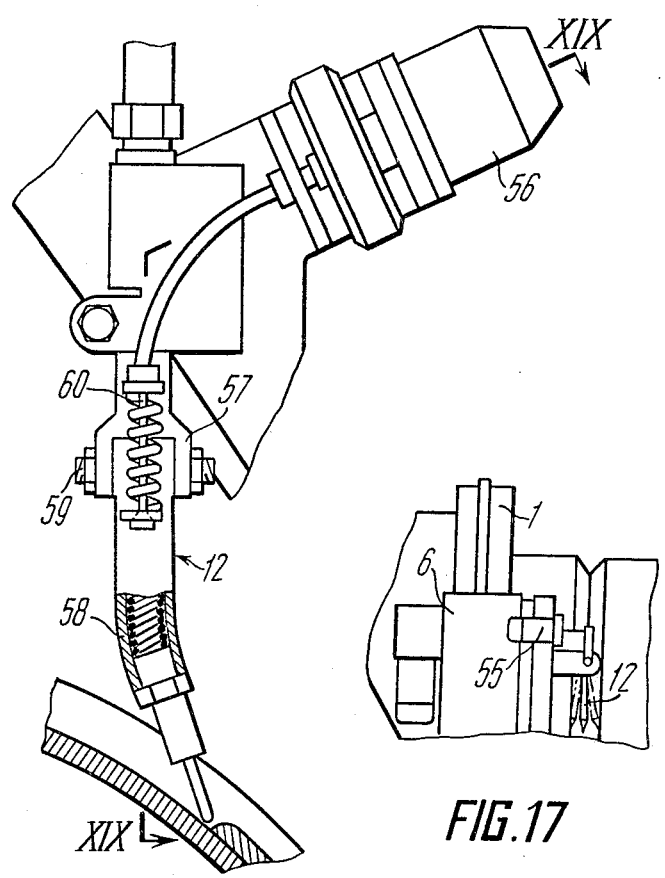
FIG. 17 shows an embodiment of the apparatus comprising an occillating electrode, according to the invention.
FIG. 18 is a partially cut-away view of a modification of the drive adapted to impart an oscillatory motion to the guiding nozzle, according to the invention.

When welding girth joints having a wide groove it is advisable to take advantage of the embodiment shown in FIG. 17. According to this embodiment each guiding nozzle, for instance the guiding nozzle 12, is mounted on the carriage 6 and is connected to the drive 56 adapted to impart an oscillatory motion to the guiding nozzle across the joint being welded.

Referring now to FIG. 18, the guiding nozzle 12 is composed of two portions 57 and 58 which are interconnected by a hinge joint 59. The movable portion 58 of the guiding nozzle 12 is connected by a flexible rod 60 to the drive 56 adapted to impart an oscillatory motion to said guiding nozzle.

Figure 19:
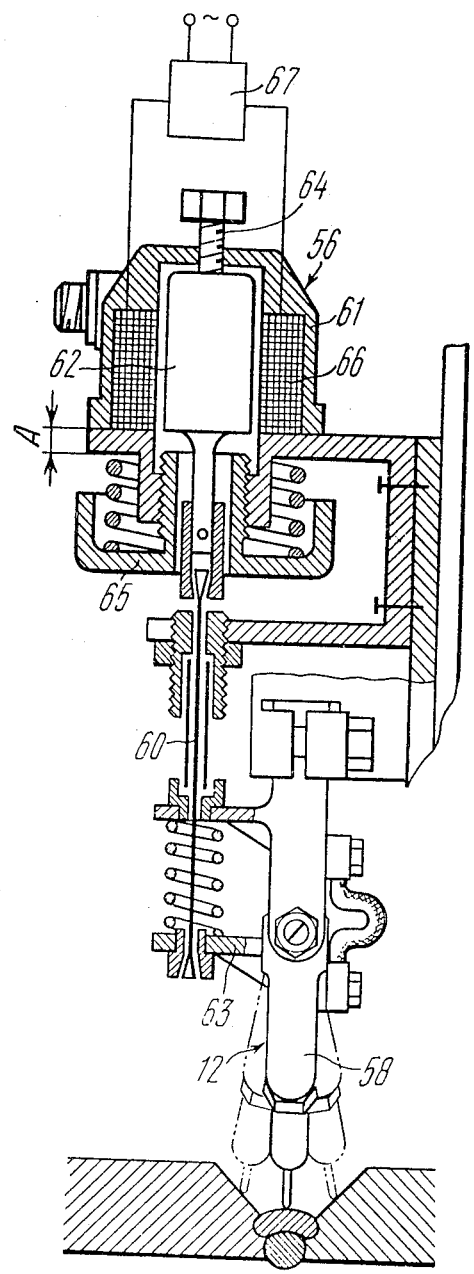
FIG. 19 shows a drive adapted to impart an oscillatory motion to the guiding nozzle along line XIX—XIX in FIG. 18, according to the invention.

Referring to FIG. 19, the drive 56 adapted to impart an oscillatory motion to the guiding nozzle 12 is an electromagnet 61 whose movable core 62 through the flexible rod 60 is operatively connected with a lever 63 of the movable portion 58 of the guiding nozzle 12. The electromagnet 61 is provided with adjustable overrunning stops 64 and 65 adapted to define the end position of the core 62. A winding 66 of the electromagnet 61 is switched into the supply circuit through a time relay 67.

The nature of the method will become more fully apparent from the following description of the operation of the apparatus. According to the invention, the method for welding girth joints in pipe lines using the apparatus described above is carried out in the following way.

The semi-annular portions 4 and 5 being spaced apart with the aid of the power cylinder 21, are lowered by a hoist onto the pipe line to be welded in close proximity to the joint. Then a reverse motion is imparted to the rod of the power cylinder 21 whereby the semi-annular portions 4 and 5 are brought together to embrace the pipe line and to form the annular track structure 1. The semi-annular portions 4 and 5 are closed by the releasable connector 20.

The bars 29 together with the rotatable locators 23 are extended from the bushings 33, and said rotatable locators 23 are inserted into the groove of the joint. The pipe is tightly clamped by the rotatable clamping members 27. Prior to moving the welding heads 2 and 3, the bars 29 of the rotatable locators 23 are retracted into the bushings 33. Then the drives 14 and 15 are switched on to impart a translatory motion to the carriages 6 and 7 and, accordingly, to the welding heads 2 and 3 mounted thereon. The welding heads 2 and 3 are moved upwards along the girth joint and at the same time fed with the welding wire through the guiding nozzles 12 and 13 substantially tangentially to the surface of the pipe. When using electric welding, a difference in electrical potential is set up between the welding wire which is an electrode and the workpiece being welded. This difference in electrical potential should be sufficient to allow for stable arc burning. As the welding heads 2 and 3 are moved upwards, the welding wire and the edges of the butted pipes melt down thus forming a welding bath which is moulded into a circumferential weld by the weld moulding members 17 and 18 adapted to hold the metal in the welding zone. To move the welding heads 2 and 3, it is necessary to set the carriages 6 and 7 in motion. For this purpose, the drives 14 and 15 whose gear wheels mesh with the gear rim 16 are switched on to impart a translatory motion to said carriages. With any eccentricity of the pipe, the lever 35 acted upon by the member 17 turns relative to its end hinged to the carriage 6 and thereby moves the welding head 2 and the guiding nozzle 12 into position, substantially following the profile of the pipe cross-section.

Figure 20:
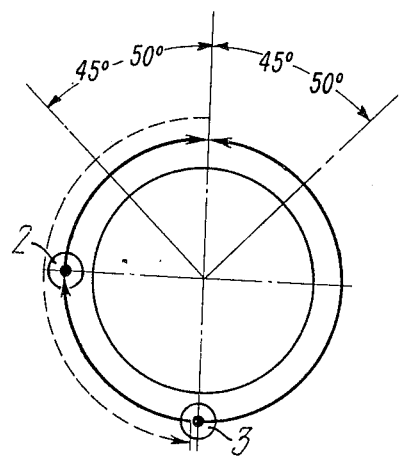
FIG. 20 shows diagrammatically the movement of the welding heads when carrying out the optimum modification of the method, according to the invention.

The most preferable is an embodiment of the method, wherein during the start of the welding, one of the welding heads, for instance the welding head 3, is positioned at the lowermost point of the girth joint and the other welding head 2 at a distance therefrom, whereupon both welding heads are simultaneously moved in the upward direction and after moulding a weld along the section of the welding head 2, the latter is moved to the lowermost point of the girth joint to weld the remaining section thereof disposed between the points of the initial position of the welding heads 2 and 3. The path of the welding heads 2 and 3 when carrying out this embodiment of the method is shown in FIG. 20 where the working stroke of the welding heads 2 and 3 is shown by solid lines with arrow heads and the return of the welding head 2 at an increased speed to the lowermost point of the joint, i.e. the idle stroke, is shown by a dash line.

When welding thick-walled workpieces the welding wire, during the upward movement of the welding heads 2 and 3, is fed through the depth of the joint from the level of the outer surface of the pipe at the lowermost point of the joint to the level of the inner surface of the pipe at the uppermost point of the joint. This movement is performed with the aid of the drive 43 adapted to change the position of the end 42 of the guiding nozzle 12. The position of the welding wire on the oppositely disposed carriage 7 is changed in the manner similar to that described above.

It will be appreciated that when the guiding nozzle 12 moves angularly or moves in parallel to the tangent to the surface of the pipe the end of the welding wire will change its position through the depth of the joint being welded.

The simplest way of moving the welding wire consists in that the welding wire is fed from the level of the outer surface of the pipe to the level of the inner surface of the pipe in a single pass when welding the upper section of the girth joint confined by a central angle of 45° to 50°.

The best results are gained if the welding wire, is fed by angularly moving the same with respect to the tangent to the surface of the pipe, when the upper section of the joint confined by a central angle of 45° to 50° is welded, and the same wire is fed in parallel to the tangent to the surface of the pipe when the lower and lateral sections of the pipe are welded. This is caused by the movement of the carriages 6 and 7 whereupon the potentiometric pick-ups 55 are secured to interact with the curved surface 53 of the protrusion 52 and send control signals indicative of the location of the welding heads 2 and 3. The control signals from the potentiometric pick-ups are sensed by the drives 44 and 47 for changing the position of the guiding nozzles 12 and 13.

When welding thick-walled containers having a wide groove it is advisable that during the upward movement of the welding heads 2 and 3 the welding wire is oscillated across the joint being welded. For this purpose, the drive 56 imparts an oscillatory motion to the guiding nozzle 12. To impart an oscillatory motion to the guiding nozzle 12, the power in the present embodiment of the apparatus is fed to the winding 66 of the electromagnet 61 through a time relay 67. The core 62 by changing its position turns the lower portion 58 of the guiding nozzle 12 through the flexible rod 60. The time relay 67 is adjusted so as to retain the guiding nozzle 12 in its end positions for some time for better melting the edges of the pipes being welded.

Depending on the width and shape of the joint groove the amplitude of oscillations of the guiding nozzle 12 is varied by screwing the adjustable overrunning stops 64 and 65 in or out.

The invention will now be described with reference to some examples of the method.

EXAMPLE 1

The girth joints of the pipes 1420 mm in diameter and having the walls 17 mm thick were welded using a core welding wire 2.3 mm in diameter. The voltage and current supplied to the welding wire were respectively from 25 to 28 V and from 300 to 350 A. The welding heads were moved at a speed of 15 to 18 m/h. The welding was carried out in two layers, i.e. in two passes of the welding heads. The girth joint was welded for 15 to 20 min. The metal of the moulded weld was tested to show the following mechanical properties: breaking strength, 64.4 kg/mm$^2$; yield limit, 57.4 kg/mm$^2$; relative elongation, 22.7%; impact resistance, 12.5 kgm/cm$^2$ at a temperature of $-40°$ C.

EXAMPLE 2

The girth joints of the same pipes were welded in a manner similar to that described above, but at the instant the welding began, one of the welding heads was positioned at the lowermost point of the joint and the other at a right angle to the former. Thereupon both heads were simultaneously moved upwards while welding the joint. Once the second welding head had reached the uppermost point of the girth joint, the power was switched off therefrom, and the feeding of the welding wire discontinued. Then the second welding head was moved into the lowermost point of the joint at a speed of 300 m/h, whereupon the power supply and the welding wire feeding were resumed to weld the remaining section of the girth joint disposed between the points of the initial position of the welding heads. The weld was formed during 15 min. The mechanical properties of the girth joint were similar to those of the previous example.

EXAMPLE 3

The girth joints of the pipes 1020 mm in diameter and having the walls 8 mm thick were welded in one pass. While moving the welding heads upwards, the lower and lateral sections of the girth joint were welded by feeding the welding wire tangentially to the surface of the pipe. The upper section of the girth joint confined by a central angle of 45° to 50° was welded while moving the welding wire through the depth of the joint by moving the guiding nozzles through an angle of 15° to 20° with respect to the tangent to the surface of the pipe. The welding heads were moved with a speed of 10 to 12 m/h. The core welding wire 3 mm in diameter was fed with the voltage of 28 V and the current of 350 to 400 A. The girth joint was welded for 10 min. The mechanical properties of the metal of the girth joint were the following: breaking strength, 57 kg/mm$^2$; yield limit, 48.1 kg/mm$^2$; relative elongation, 21.7%, impact resistance, 9 kgm/cm$^2$ at a temperature of $-40°$ C.

EXAMPLE 4

The method according to the invention was used when welding cylindrical shells 2000 mm in diameter. The thickness of the walls of the shells was 6 mm. The diameter of the core welding wire used in the process was 2 mm. The welding was carried out in one pass, the voltage and current supplied to the welding wire being respectively 27 V and 300 A. The welding heads were moved at a speed of 20 to 25 m/h. The whole process was carried out in 10 min. The mechanical properties of the weld, as tests showed, were within the permissible limits.

EXAMPLE 5

According to the invention, the girth joints of pipe lines 1420 mm in diameter and having walls 17 mm thick were welded. While moving the welding heads upwards, the welding wire was fed through the depth of the joint in parallel to the tangent to the surface of the pipe. The diameter of the core welding wire used in the process was 2.3 mm, the voltage and current supplied to the welding wire being respectively 27 V and 300 A. The welding heads were moved at a speed of 15 to 18 m/h. It took 15 min. for the circumferential weld to form. The mechanical properties of the weld, as testing showed, were similar to those of the parent metal.

EXAMPLE 6

According to the invention, the girth joints of pipe lines 1220 mm in diameter and having the walls 12 mm thick were welded. While moving the welding heads upwards along the lower and the lateral sections of the girth joint the welding wire was fed through the depth of the joint in parallel to the tangent to the surface of the pipe. When welding the upper section of the girth joint the welding wire was fed through the depth of the joint by moving the guiding nozzles through 15° to 20° with respect to the tangent to the surface of the pipe. The core welding wire used in the welding process was 2.3 mm in diameter. The other operating conditions were the following: the speed of the welding heads was from 15 to 18 m/h; voltage, 27 V; current, 300 A The girth joint was welded in 12 min. The mechanical properties of the metal of the weld were similar to those of the parent metal.

EXAMPLE 7

The method according to the invention was used for welding pipe lines intended to operate under an internal pressure of 50 to 100 atms. The pipes were 1420 mm in diameter; the thickness of the wall, 21.6 mm The maximum width of the groove of the joint was 20 mm. The welding wire was fed through the depth of the joint while simultaneously imparting an oscillatory motion to the guiding nozzle accross the girth joint being welded. The operating conditions of the process were the following: the speed of the welding heads, 12 m/h; voltage, 27 V; current, 300 A. The core welding wire used in the process was 3 mm in diameter. The girth joint was welded in three passes. This being the case, the weld moulding member having a protrusion shown in FIG. 10 was used to mould two lower layers of the weld. The duration of the welding process ranged from 28 to 33 min. The mechanical properties of the metal of the girth joint, as testing showed, were similar to those of the parent metal.

It is to be understood that various modifications may be made in the invention without departing from the spirit of the following claims.

What is claimed is:

1. A method for welding girth joints in pipe lines using several welding heads, comprising the steps of:
    moving each of said welding heads around the pipe line and a respective section of the girth joint so that the welding heads are moved upwards;
    feeding a welding wire to each of the welding heads so that the welding wire is fed substantially tangentially with respect to the surface of the pipe while welding the girth joint at the lower and lateral sections of the pipe line and then feeding said welding wire through the depth of the girth joint by angularly positioning said welding wire from 15° to 20° with respect to the tangent to the surface of the pipe while welding the uppermost portions of the girth joint as said welding heads move upwards;
    forming a circumferential weld along the whole of the girth joint;
    moulding the circumferential weld simultaneously with the formation thereof to hold the molten metal of the welding bath in the welding zone.

2. A method as claimed in claim 1, wherein during the start of welding, one of said welding heads is positioned at the lowermost point of the girth joint of the pipes and another of said welding heads at a position higher than and at a circumferential distance therefrom, the distance being at least equal to the size of a welding head to prevent collision of the welding heads during welding of a top portion of the joint, whereupon said one and said another welding heads are moved upwards and after moulding a weld along said section traversed by the another said welding head, the another said welding head is moved to the lowermost point of the joint to weld the remaining section thereof disposed between the points of the initial positions of the welding heads.

3. A method as claimed in claim 1, wherein said welding wire is fed through the whole depth of the girth joint of the pipes from the level of the outer surface of the pipe of the lowermost point of the joint to the level of the inner surface of the pipe at the uppermost point of the girth joint as said welding heads move upwards.

4. A method as claimed in claim 3, wherein said welding wire is fed from the level of the outer surface of the pipe to the level of the inner surface of the pipe in a single pass when welding the uppermost section of the girth joint, said uppermost section subtending an angle ranging from 45° to 50°.

5. A method as claimed in claim 1, wherein said welding wire is oscillated across the girth joint being welded when said welding heads move upwards.

6. A method for welding girth joints in pipe lines using several welding heads, comprising the steps of:
    moving each of said welding heads around the pipe line and a respective section of the girth joint so that the welding heads are moved upwards;
    feeding a welding wire to each of the welding heads so that the welding wire is intially fed substantially tangentially with respect to the surface of the pipe, said welding wire being fed through the depth of the girth joint by angularly positioning said wire through 15° to 20° with respect to the tangent to the surface of the pipe during welding of uppermost portions of the girth joint so that said welding wire is fed through the whole depth of the girth joint of the pipe from the level of the outer surface of the pipe at the lowermost point of the joint to the level of the inner surface of the pipe at the uppermost point of the girth joint as said welding heads move upwards;
    forming a circumferential weld along the whole of the girth joint;
    forced forming the circumferential weld simultaneously with the formation thereof to hold the molten metal of the welding bath in the welding zone.

7. A method for welding girth joints in pipe lines using several welding heads, comprising the steps of:
    moving each of said welding heads around the pipe line and a respective section of the girth joint so that the welding heads are moved upwards;
    feeding a welding wire to each of the welding heads so that the welding wire is fed substantially tangentially with respect to the surface of the pipe while welding the girth joint at the lower and lateral sections of the pipe line and then feeding said welding wire through the depth of the girth joint by angularly positioning said welding wire from 15° to 20° with respect to the tangent to the surface of the pipe while welding the uppermost portions of the girth joint as said welding heads move upwards,
    the upward movement of said welding heads being such that the welding wire and associated arc burning point reach the level of inner surfaces of the pipe lines;
    forming a circumferential weld along the whole of the girth joint;
    moulding by forced formation the circumferential weld simultaneously with the formation thereof to hold the molten metal of the welding bath in the welding zone.

* * * * *